United States Patent Office 3,223,738
Patented Dec. 14, 1965

3,223,738
CYCLODODECADIENYL MERCAPTANS
AND THIOETHERS
Donald L. Crain, Roger F. Kleinschmidt, and John E.
Mahan, Bartlesville, Okla., assignors to Phillips Petroleum Company, a corporation of Delaware
No Drawing. Filed Mar. 15, 1963, Ser. No. 265,320
5 Claims. (Cl. 260—609)

This invention relates to novel organic sulfur compounds and a process for producing same. More particularly, this invention relates to novel cyclic mercaptans and thioethers having unsaturated linkages therein and a process of producing same by reacting hydrogen sulfide with the corresponding unsaturated cyclic organic compound. In one of its more specific embodiments this invention relates to forming novel cyclododecadienyl mercaptans and thioethers by the reaction of a compound of the formula RSH with a cyclododecatriene.

It has been disclosed recently by G. Wilkie in Angew. Chem. 69 3987–8 (1957) that butadiene can be trimerized in 80 percent yields to trans,trans,cis-1,5,9-cyclododecatriene. This trimerization is carried out by means of a catalyst system comprising an organoaluminum such as triethylaluminum in conjunction with a metal halide such as titanium tetrachloride. The cyclic triene which is formed boils at 100–101° C. at 11 millimeters of $H_g$ absolute pressure. Thus, this represents a method of preparing a 12 carbon compound from a compound of much lower molecular weight. In addition to the above compound, other related cyclotrienes can be prepared by trimerizing compounds such as isoprene and piperylene to give the corresponding trimethylcyclododecatrienes.

According to the present invention novel cyclododecadienyl mercaptans and thioethers of the formula R—S—R' wherein R is selected from the group consisting of hydrogen and alkyl and aralkyl radicals containing from 1 to 12 carbon atoms, inclusive, and R' is selected from the group consisting of cyclododecadienyl and trimethylcyclydodecadienyl radicals, are prepared by the reaction of a cyclic trimer of butadiene, isoprene or piperylene with a compound of the formula RSH, wherein R is a previously defined.

Thus it is an object of this invention to provide a process for the reaction of RSH compounds with cyclic trienes to form cyclodienyl derivatives containing only one mercapto or thioether linkage.

It is a further object of this invention to provide novel mercaptans containing a cyclodienyl group.

Other aspects, objects and the several advantages of this invention will be apparent from the specification and the appended claims.

According to this invention, the novel cyclodienyl compounds are prepared by reacting RSH compounds as defined above with a cyclic triene compound corresponding to the cyclic trimers formed from butadiene, isoprene or piperylene in the presence of a free radical agent. Such free radical agents can be chemical sources of free radicals, or the free radicals can be supplied by energy sources which cause the formation of free radicals in situ. For example, peroxide compounds and organic azo compounds can be employed as chemical sources of free radicals, and actinic irradiation can be employed for the generation of free radicals. The terminology "actinic irradiation" as used herein includes activating rays such as ultraviolet rays having a wave length in the range of 100–3800 Angstroms and ionizing rays such as alpha rays, beta rays, gamma rays, X-rays, neutrons and the like. The ultraviolet rays can be supplied from lamps and the like, while the ionizing irradiation can be supplied from such sources as cathode tubes, accelerators, natural and artificial radioactive elements, spent fuel elements from atomic reactors and the like. If actinic irradiation is employed, the energy level of the irradiation will generally be in the range between 2.1 and $1 \times 10^8$ electron volts. The irradiation dose rate will generally be from $10^3$ to $10^{10}$ roentgens per hour while the total irradiation dosage will generally be from $10^5$ to $10^{11}$ roentgens. The amount of chemical-free radicl agent which can be employed can vary over a wide range but is generally less than 5 mol percent based on the cyclododecatriene.

In the present process, the contacting of the RSH compound with the cyclic triene compound in the presence of free radical agents is effected at a temperature of from −10 to 300° F., preferably from 50 to 150° F. The reaction time can vary considerably but will generally range from 0.5 to 20 hours, preferably from 1 to 5 hours. The mol ratio of RSH compound to the cyclotrienyl compound is generally in the range of from 0.1 to 10, preferably from 0.4 to 4. The reaction is generally carried out in the presence of a solvent. Such solvents as saturated hydrocarbons and aromatic hydrocarbons are preferred, although other solvents such as alcohols can be employed if desired. In some cases, the RSH compound serves as the solvent or diluent in the reaction. Specific examples of solvents which can be employed are normal butane, normal hexane, isooctane, cyclohexane, benzene, toluene, xylene, ethyl alcohol, isopropyl alcohol, and the like.

Some specific examples of chemical-free radical catalysts which can be used include di-tert alkyl peroxides, alkyl hydroperoxides, alkyl peroxy esters, diacyl peroxides and the like. Preferred chemical-free radical sources are the azo compounds such as $\alpha,\alpha'$-azo diisobutyronitrile and others such as are disclosed in U.S. Patents 2,471,959, 2,492,763, and 2,503,253.

As an additional feature of this invention, reaction promoters can be used in addition to the free radical catalyst. In particular, trialkyl phosphites having the general formula $(RO)_3P$ are used, wherein R is a 1 to 10 carbon alkyl and preferably where each R is the same alkyl radical having 1 to 5 carbon atoms. The amount of promoter used can vary but will generally range from 0.001 to 100 mols per mol of cyclododecatriene.

Representative phosphites which can be employed as promoters in the present invention include trimethyl phosphite, tri-n-butyl phosphite, tri-n-decyl phosphite, and the like.

The reaction of this invention can be carried out in a batch, intermittent or continuous manner. The pressure at which the reaction is carried out can vary widely and generally will be the equilibrium pressure of the reaction mixture at the reaction temperature which is chosen from the above range. After the reaction is completed, the product can be recovered by such well-known means as fractionation, crystallization, extraction and the like.

As will be shown in the following specific examples, the reaction of a RSH compound with a cyclododecatriene results in the addition of the RSH compound with a double bond of the cyclic triene. The primary product is predominantly a mono-mercaptan or a mono-thioether product, although lesser amounts of both di- and tri- products are formed. This is somewhat surprising in that the mono-product predominates even when a large excess of RSH is used.

The term "cyclic triene compound" as employed in this disclosure is inclusive of the cyclic trimers formed from butadiene, isoprene, and piperylene. The term "cyclododecadienyl mercaptan" is inclusive of the single SR group addition to the trimer formed from butadiene, isoprene and piperylene.

As an additional feature of this invention, the thioethers which result from the reaction of the cyclododecatrienyl compounds with a mercaptan can be further treated to convert the thioethers to the corresponding sulfoxides and sulfones. Such thioethers can also be formed by alkylation of the cyclododecadienyl mercaptans. Such an oxidation is easily effected by contacting a solution of the sulfide or thioether in a solvent such as acetone or acetic acid with a peroxygen compound such as hydrogen peroxide or organic peracid such as peracetic acid, perbenzoic acid and the like. The amount of peroxygen compound necessary will depend to a large extent on whether a sulfoxide or sulfone is desired. Generally, a 1:1 mol ratio of peroxygen compound to sulfide is employed for sulfoxide preparation, while a 2:1 mol ratio of peroxygen compound to sulfide is employed for the preparation of the sulfone.

The products of this invention have wide utility. For example, the mercaptans resulting from the addition of hydrogen sulfide can be used as modifiers in SBR emulsion polymerization to reduce Mooney viscosity, while the thioethers and the corresponding sulfoxides and sulfones of the thioethers can be employed as insect combatting agents such as contact insecticides for killing houseflies, roaches, and the like.

The following specific examples illustrate the advantages of the present invention, but it is not intended that the invention be limited to the specific embodiments shown therein.

Example I

A run was carried out in which trans,trans,cis-1,5,9-cyclododecatriene (CDT) was reacted with $H_2S$ in the presence of ultraviolet light. In this run, 162 grams (1.0 mol) of CDT, 3 ml. of trimethyl phosphite, and 111 grams (3.3 mols) of $H_2S$ were charged to a quartz reactor which was metal-jacketed to withstand high pressure. A 100-watt mercury vapor lamp was inserted into the reactor, and the reactor, jacket with a cooling water section, was mounted on a shaker. The lamp was then turned on and the shaker started. The conditions during irradiation are tabulated below. In this table, the reaction appeared to have stopped after 30 minutes, so the 100-watt mercury lamp was replaced with a 450-watt ultraviolet lamp and irradiation was continued for 30 minutes. The calculated dose rate for the first 22 minutes was $1.11 \times 10^9$ roentgen/hour, while the calculated dose rate for the final 30 minutes was $8.56 \times 10^9$ roentgen/hour. The calculated total dose was $4.86 \times 10^9$ roentgen.

| Time | Temp., °F. | Pressure, p.s.i.g. |
|---|---|---|
| 0 | 64 | 150 |
| 3 | 70 | 160 |
| 10 | 70 | 150 |
| 20 | 69 | 142 |
| 30 | 68 | 149 |
| 36 | 82 | 163 |
| 40 | 83 | 170 |
| 45 | 86 | 177 |
| 60 | 86 | 190 |

The excess $H_2S$ was then vented, and the remaining material was poured out of the reactor. A total of 196.7 grams of material having a refraction index of $n_D^{20}$ 1.5307 was obtained. The increase in weight corresponds to an uptake of 1 mol of hydrogen sulfide. This reaction product was heated to 100° C. under water aspirator pressure to remove dissolved $H_2S$, after which the material was distilled at 35–76° C. in a 60 cm. x 18 mm. ID packed column. The details of the fractionation are as follows:

| Cut No. | Head Temp., °C. | Pot Temp., °C. | Pressure, mm. | Grams | $n_D^{20}$ |
|---|---|---|---|---|---|
| 1 | 35–40 | 110–130 | 0.20–0.25 | 21.1 | -------- |
| 2 | 40–70 | 130–139 | 0.20–0.25 | 5.2 | -------- |
| 3 | 71–76 | 139–141 | 0.20–0.25 | 14.7 | 1.5319 |
| 4 | 76 | 141 | 0.20–0.25 | 21.9 | 1.5327 |
| 5 | 74–76 | 140–150 | 0.20–0.25 | 20.4 | 1.5328 |
| 6 | 74–76 | 150–175 | 0.20–0.25 | 20.0 | 1.5328 |

Elemental and mercaptan analyses of a 5-gram sample of Cut 5 showed good agreement with the mono-addition product of $H_2S$ and CDT.

| | C | H | S | Mercaptan Sulfur |
|---|---|---|---|---|
| Calculated weight percent for $C_{12}H_{20}S$ | 73.4 | 10.3 | 16.3 | 16.3 |
| Found | 73.2 | 10.1 | 16.5 | 16.9 |

Example II

The mercaptan from Example I was then converted to the methyl thioether, which was then oxidized, in separate steps, to the corresponding sulfoxide and sulfone.

The preparation of the methyl thioether (methyl cyclododecadienyl sulfide) was carried out by charging 9.8 grams (0.05 mol) of Cut 4 from Example I, 3.5 grams of 85% KOH and 30 ml. absolute ethanol to a 100 ml., 3-necked flask equipped with a stirrer and a condenser. A nitrogen atmosphere was maintained in the flask, and to the stirred mixture was quickly added a solution of 7.1 grams (0.05 mol) of methyl iodide in 10 ml. absolute ethanol. An exothermic reaction occurred, and a white solid rapidly precipitated. After 30 minutes, the mixture was diluted with 50 cc. of water, and the resulting mixture was extracted several times with n-pentane. The combined pentane extracts were then washed once with dilute aqueous sodium hydroxide, five times with water, and then dried. Evaporation of the pentane yielded 11.2 grams of methyl cyclododecadienyl thioether.

This residue was then dissolved in 75 ml. of acetone containing 13.6 percent by weight of aqueous hydrogen peroxide, and the resulting solution was allowed to stand at room temperature for approximately 60 hours. The solution was then poured into water and extracted with ether. The ether extracts were washed with saturated aqueous ferrous sulfate solution until no peroxide could be detected. The ether solution was then washed with water and dried over calcium sulfate. Evaporation of the ether left a residue weighing 10.0 grams. An infrared analysis of this material revealed that the product was a sulfoxide. This sulfoxide was methyl cyclododecadienyl sulfoxide.

The sulfoxide was then dissolved in 30 cc. of glacial acetic acid, the solution heated to approximately 100° C. on a steam bath, and 6.8 grams of 30 percent by weight aqueous hydrogen peroxide added slowly to the hot solution. The reaction mixture was maintained at this temperature for one hour after the addition was completed. The solution was cooled slowly, poured into water, and worked up by the procedure employed for the sulfoxide. The acetic acid was removed prior to drying by washing the ether solution with aqueous sodium bicarbonate solution. Evaporation of the dried ether solution left a residue of 9.6 grams. Upon cooling to 5° C. for 2 days, the mass solidified. This solidified mass contained some crystals of methyl cyclododecadienyl sulfone.

While the above examples employ, for purposes of illustration, the trans,trans,cis-cyclododecatriene which results in a mercaptan thereof having an apparent 4,8-trans,trans configuration, all isomeric forms of both the cyclododecatriene and reaction products thereof are contemplated within the scope of the present invention.

We claim:
1. Methyl cyclododecadienyl thioether.
2. Methyl trimethylcyclododecadienyl thioether.
3. A process for producing cyclododecadienyl mercaptans which comprises reacting a trimer of a compound selected from the group consisting of butadiene, isoprene and piperylene with hydrogen sulfide in the presence of a free radical agent and at a temperature within the range of $-10°$ to $300°$ F.
4. A process for producing cyclododecadienyl thioethers which comprises reacting a trimer of a compound selected from the group consisting of butadiene, isoprene and piperylene with a compound of the formula RSH, wherein R is selected from the group consisting of alkyl and aralkyl radicals having from 1 to 12 carbon atoms in the presence of a free radical agent and at a temperature within the range of $-10°$ to $300°$ F.
5. A process for producing cyclododecadienyl mercaptans and thioethers which comprises reacting in the presence of a free radical agent a trimer of a compound selected from the group consisting of butadiene, isoprene and piperylene with a compound of the formula RSH wherein R is selected from the group consisting of hydrogen, alkyl and aralkyl radicals containing 1 to 12 carbon atoms at a temperature within the range of $-10°$ to $300°$ F. and wherein the mol ratio of RSH to the cyclododecadienyl compound is within the range of 0.1 to 10.

References Cited by the Examiner

UNITED STATES PATENTS

| | | | |
|---|---|---|---|
| 3,019,267 | 1/1962 | Mahan et al. | 260—609 |
| 3,025,327 | 3/1962 | May et al. | 260—609 |
| 3,081,352 | 3/1963 | Gardner et al. | 260—609 |

OTHER REFERENCES

Ipatieff et al.: Jour. Amer. Chem. Soc., vol. 61, pp. 71–74 (1939).

CHARLES B. PARKER, *Primary Examiner.*

DANIEL D. HORWITZ, IRVING MARCUS,
*Examiners.*